United States Patent
Yamamoto

(10) Patent No.: US 12,027,123 B2
(45) Date of Patent: Jul. 2, 2024

(54) LIGHT EMITTING DEVICE HAVING A PIXEL, A DRIVING TRANSISTOR, A LIGHT EMISSION CONTROL TRANSISTOR, A WRITE TRANSISTOR, AND A CAPACITIVE ELEMENT

(71) Applicant: CANON KABUSHIKI KAISHA, Tokyo (JP)

(72) Inventor: Tetsuro Yamamoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/175,695

(22) Filed: Feb. 28, 2023

(65) Prior Publication Data

US 2023/0306910 A1    Sep. 28, 2023

(30) Foreign Application Priority Data

Mar. 24, 2022    (JP) ................. 2022-048419

(51) Int. Cl.
    *G09G 3/3233*    (2016.01)
    *G06F 1/16*      (2006.01)
    *H04M 1/02*      (2006.01)
    *H04N 23/63*     (2023.01)

(52) U.S. Cl.
    CPC ......... *G09G 3/3233* (2013.01); *G06F 1/1601* (2013.01); *G06F 1/163* (2013.01); *G06F 1/1637* (2013.01); *G09G 2300/0426* (2013.01); *G09G 2300/0852* (2013.01); *G09G 2310/08* (2013.01); *G09G 2380/10* (2013.01); *H04M 1/0266* (2013.01); *H04N 23/63* (2023.01)

(58) Field of Classification Search
    CPC .................................................. G09G 3/3233
    See application file for complete search history.

(56) References Cited

U.S. PATENT DOCUMENTS 7,496,278 B2    2/2009    Miyamoto
8,023,802 B2    9/2011    Miyamoto
(Continued)

FOREIGN PATENT DOCUMENTS

JP    2008-176272 A    7/2008
JP    2010-145579 A    7/2010
(Continued)

*Primary Examiner* — Chun-Nan Lin
(74) *Attorney, Agent, or Firm* — VENABLE LLP

(57) ABSTRACT

A light emitting device including a light emitting element, a driving transistor connected to the light emitting element and configured to supply a current corresponding to a signal, a light emission control transistor arranged between the driving transistor and a potential supply line and configured to control emission or non-emission of the light emitting element, a write transistor configured to supply the signal to the driving transistor, is provided. One frame period includes a write period during which the write transistor is rendered conductive and the signal is written, and a light emission period during which the light emission control transistor changes from a non-conductive state to a conductive state and the light emitting element emits light. After a start of the write period and before an end of the write period, the light emission control transistor is rendered conductive.

19 Claims, 14 Drawing Sheets

(56) References Cited

U.S. PATENT DOCUMENTS

| | | | | |
|---|---|---|---|---|
| 2010/0149152 A1* | 6/2010 | Yamamoto | ........... | G09G 3/3233 |
| | | | | 345/76 |
| 2010/0149153 A1* | 6/2010 | Yamamoto | ........... | G09G 3/3233 |
| | | | | 345/214 |
| 2019/0305014 A1* | 10/2019 | Yamamoto | ........... | H10K 59/126 |

FOREIGN PATENT DOCUMENTS

| JP | 2010145579 | * | 7/2010 |
| JP | 2019-82548 A | | 5/2019 |
| JP | 2020-76974 A | | 5/2020 |

* cited by examiner

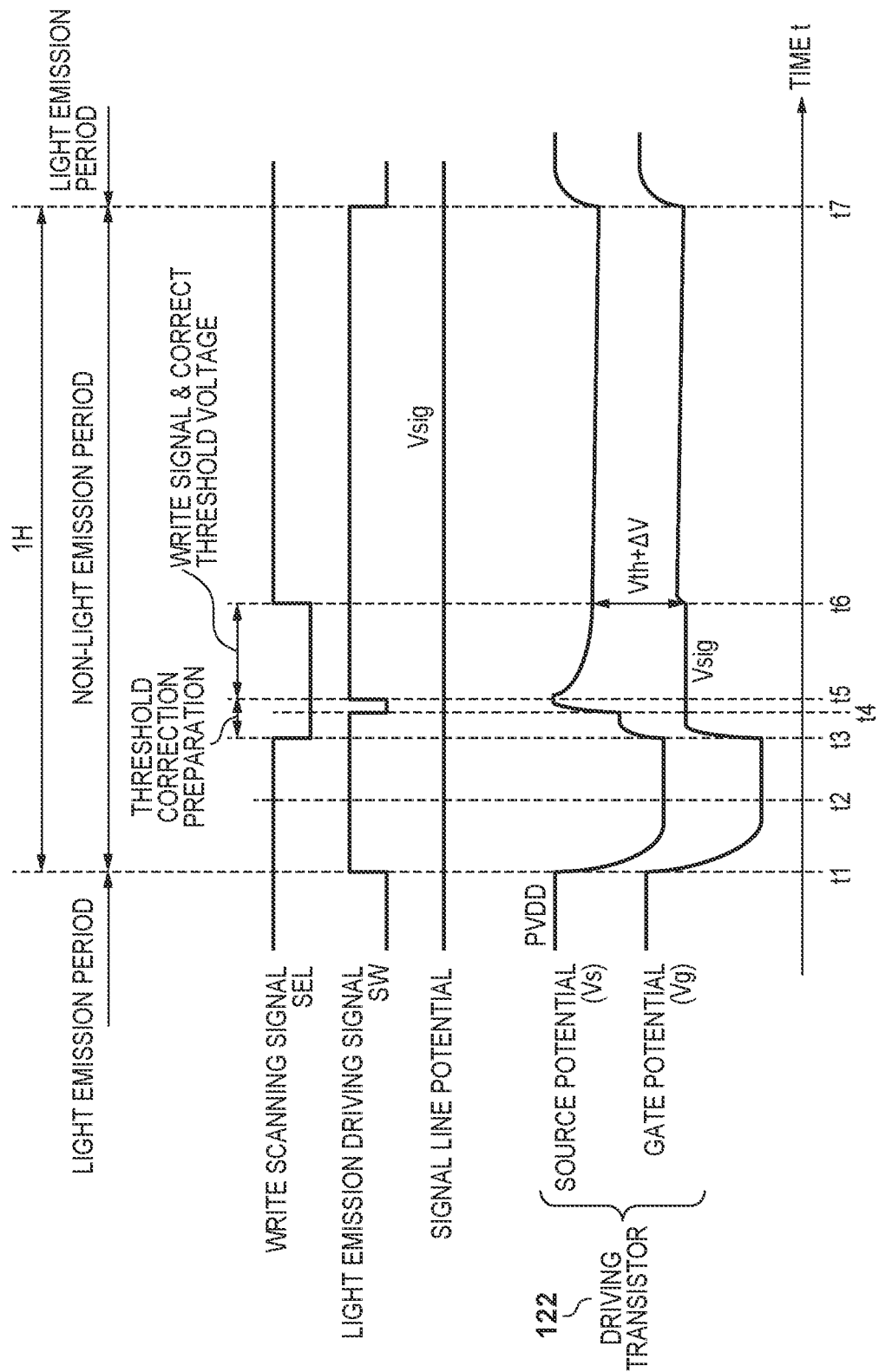

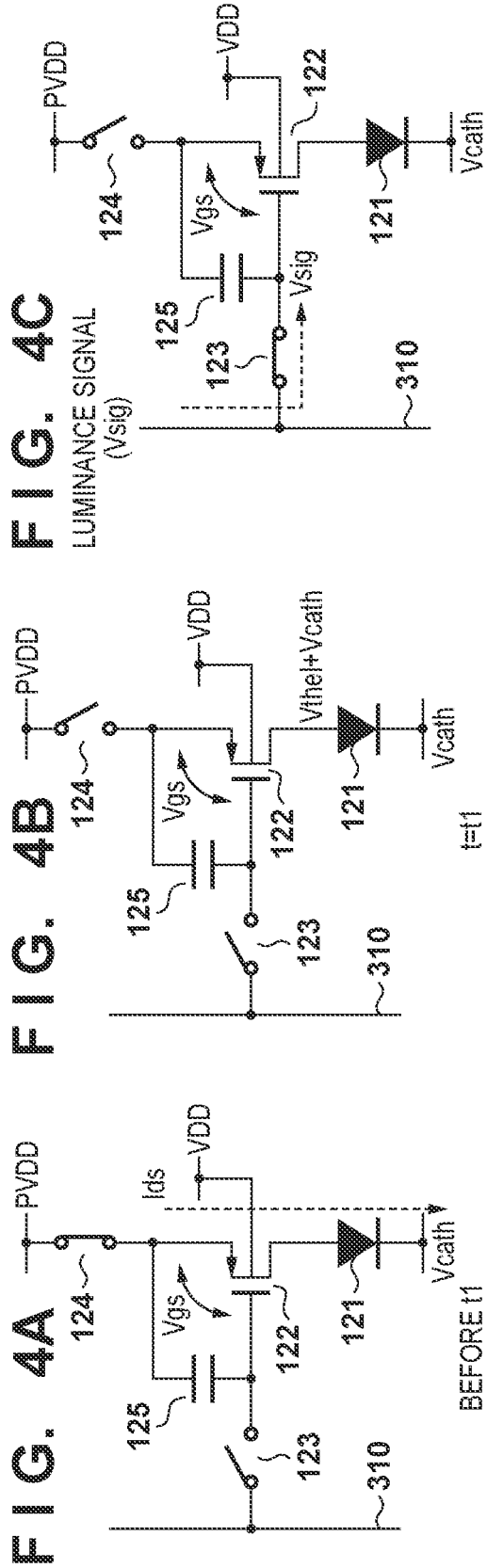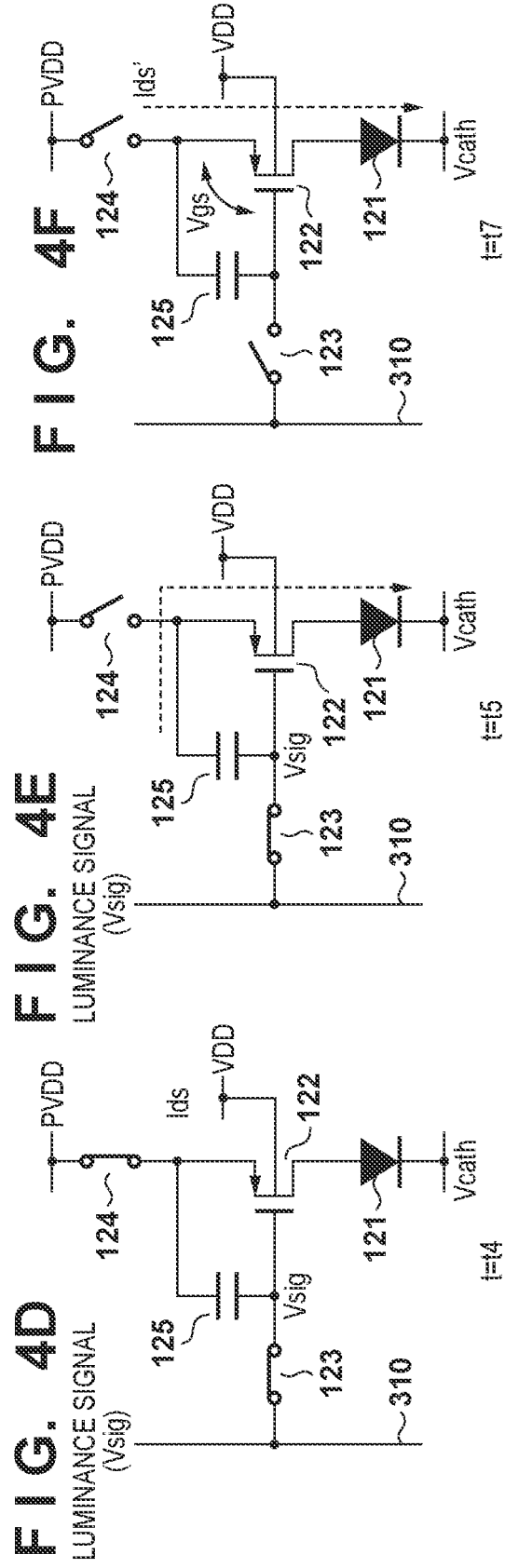

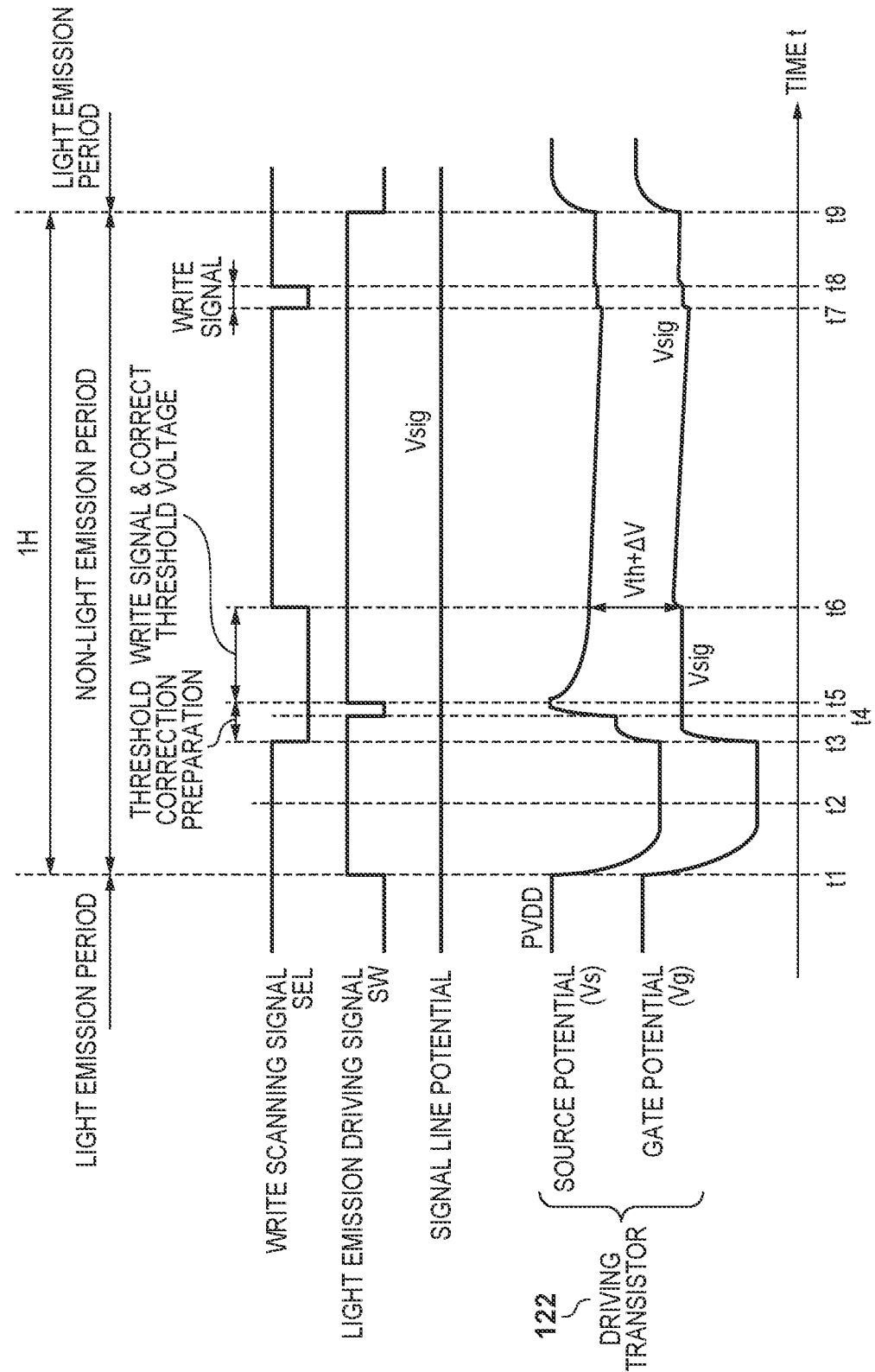

| | t6 (SEL: CHANGE) | t6~t7 | t7 (Vsig WRITING) | t8 (SEL: CHANGE) |
|---|---|---|---|---|
| NEAR END SIDE | Vg CHANGE LARGE → Vgs SMALL | Id SMALL → Vg CHANGE SMALL | Vg CHANGE SMALL → Vgs LARGE | Vg CHANGE LARGE → Vgs SMALL |
| FAR END SIDE | Vg CHANGE SMALL → Vgs LARGE | Id LARGE → Vg CHANGE LARGE | Vg CHANGE LARGE → Vgs SMALL | Vg CHANGE SMALL → Vgs LARGE |

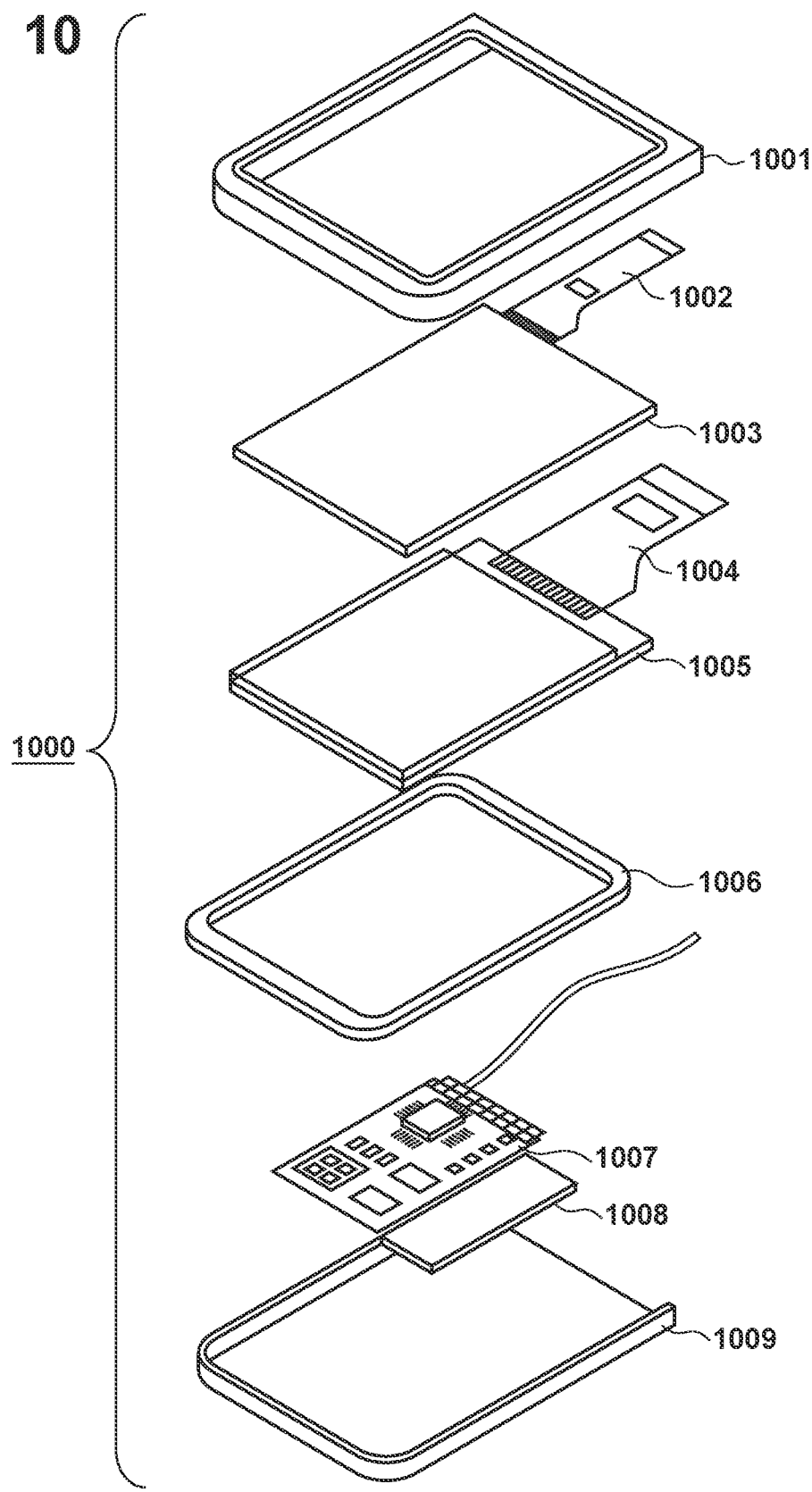

LIGHT EMITTING DEVICE HAVING A PIXEL, A DRIVING TRANSISTOR, A LIGHT EMISSION CONTROL TRANSISTOR, A WRITE TRANSISTOR, AND A CAPACITIVE ELEMENT

BACKGROUND OF THE INVENTION

Field of the Invention

The present invention relates to a light emitting device, a display device, a photoelectric conversion device, an electronic apparatus, an illumination device, a moving body, and a wearable device.

Description of the Related Art

Interest in a light emitting device using a self-light emitting element such as an organic electroluminescence (EL) element has increased. Japanese Patent Laid-Open No. 2010-145579 describes a pixel including a driving transistor for supplying a current to cause an organic EL element to emit light with predetermined luminance.

SUMMARY OF THE INVENTION

Japanese Patent Laid-Open No. 2010-145579 describes a technique of writing a reference potential for correcting a threshold via a signal line before writing a signal voltage in the gate of a driving transistor via the signal line in order to suppress deterioration of image quality caused by characteristic variations of the driving transistor. In an operation described in Japanese Patent Laid-Open No. 2010-145579, the signal voltage and the reference potential are supplied to the signal line during one horizontal period for displaying one image, thereby requiring more electric power to charge/discharge the signal line.

Some embodiments of the present invention provide a technique advantageous in reducing power consumption while maintaining image quality.

According to some embodiments, a light emitting device in which a pixel including a light emitting element, a driving transistor having a first main terminal connected to the light emitting element and configured to supply, to the light emitting element, a current corresponding to a luminance signal, a light emission control transistor arranged between a second main terminal of the driving transistor and a supply line that supplies a first potential and configured to control light emission or non-light emission of the light emitting element, a write transistor configured to supply the luminance signal to a control terminal of the driving transistor, and a capacitive element arranged between the second main terminal and the control terminal is arranged, wherein a back gate terminal of the driving transistor is supplied with a second potential, one frame period includes a write period during which the write transistor is rendered conductive and the luminance signal is written in the control terminal, and a light emission period during which, after the write period, the light emission control transistor changes from a non-conductive state to a conductive state and the light emitting element emits light corresponding to the luminance signal, and after a start of the write period and before an end of the write period, the light emission control transistor is rendered conductive, is provide.

Further features of the present invention will become apparent from the following description of exemplary embodiments (with reference to the attached drawings).

BRIEF DESCRIPTION OF THE DRAWINGS

FIG. 3 is a timing chart showing an example of the operation of the light emitting device shown in FIG. 1;

FIGS. 4A to 4F are circuit diagrams each for explaining the operation of the light emitting device at each timing in FIG. 3;

FIG. 8 is a timing chart showing an example of the operation of the light emitting device shown in FIG. 1;

FIG. 10 is a view showing an example of a display device using the light emitting device according to the embodiment;

DESCRIPTION OF THE EMBODIMENTS

Figure 1:
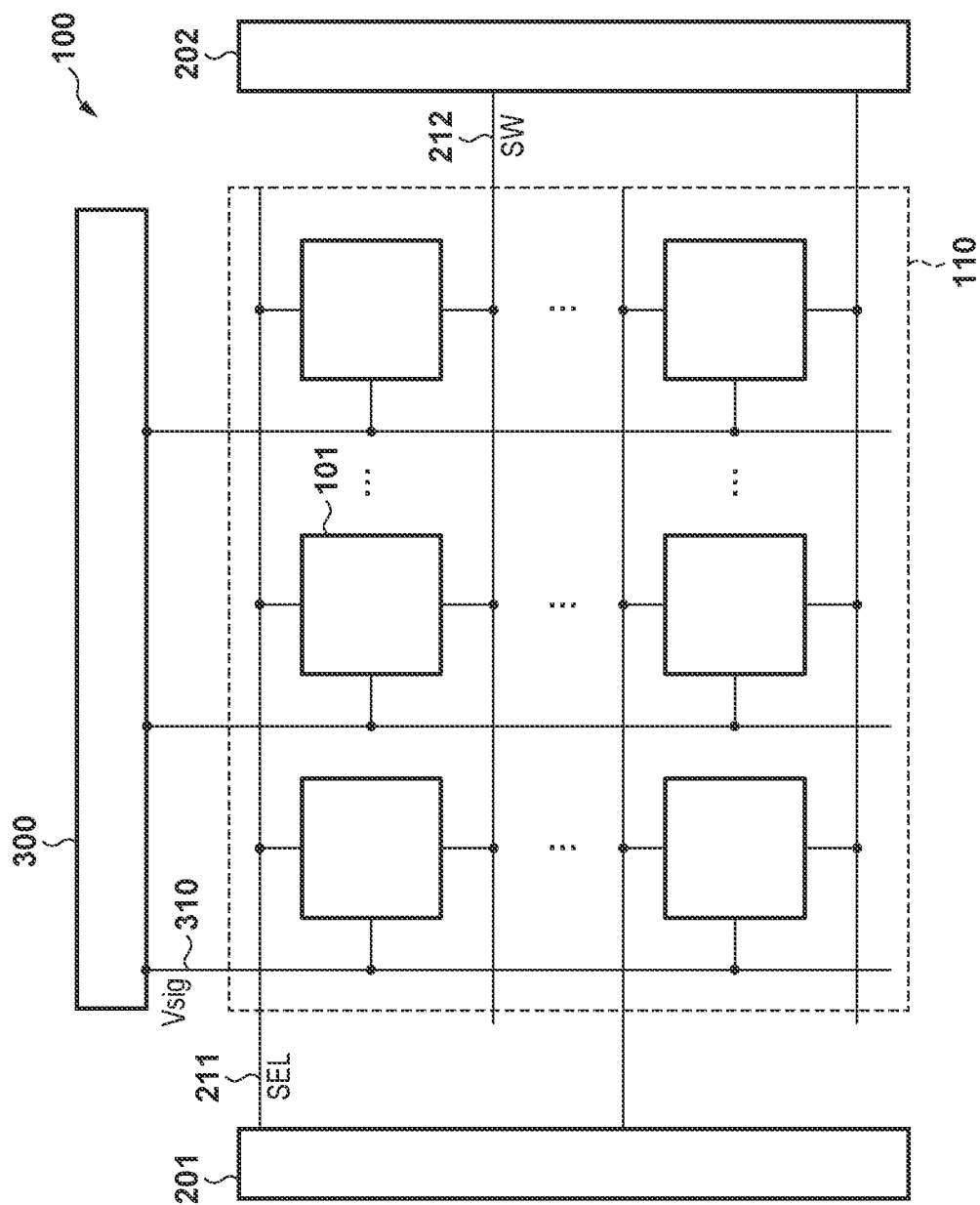
FIG. 1 is a view showing an example of the arrangement of a light emitting device according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

A light emitting device according to an embodiment of the present invention will be described with reference to FIGS. 1 to 16A and 16B. FIG. 1 is a schematic view showing an example of the arrangement of a light emitting device 100 according to this embodiment. The light emitting device 100 includes a pixel array 110 and a peripheral circuit arranged on the periphery of the pixel array 110 to operate the pixel array 110. In the pixel array 110, a plurality of pixels 101 are arranged to form a plurality of rows and a plurality of columns.

The peripheral circuit for operating (driving) each pixel in the pixel array 110 includes, for example, a scanning drive system including a write scanning circuit 201 and a light emission drive scanning circuit 202, and a signal supply system including a signal output circuit 300. In the arrangement shown in FIG. 1, the write scanning circuit 201 is arranged on the left side of the pixel array 110 and the light emission drive scanning circuit 202 is arranged on the right side of the pixel array 110. However, the layout is not limited to this. For example, the arrangement relationship between the write scanning circuit 201 and the light emission drive scanning circuit 202 may be reversed or the write scanning circuit 201 and the light emission drive scanning circuit 202 may be arranged on one side of the pixel array 110. Alternatively, a pair of the write scanning circuit 201 and the light emission drive scanning circuit 202 may be arranged on each of the left and right sides.

One "pixel" of an image displayed by the light emitting device 100 may be formed from a plurality of sub-pixels. In this case, the sub-pixels correspond to the pixels 101 shown in FIG. 1. More specifically, one pixel may be formed by, for example, three sub-pixels including a sub-pixel that emits red light, a sub-pixel that emits green light, and a sub-pixel that emits blue light. However, one pixel is not limited to such combination of the sub-pixels of the three primary colors. In addition to the sub-pixels of the three primary colors, one or a plurality of color sub-pixels may be arranged in one pixel. For example, in addition to the sub-pixels of the three primary colors, a sub-pixel that emits white light to improve luminance may be arranged in one pixel. For example, in addition to the sub-pixels of the three primary colors, one or a plurality of color sub-pixels each of which emits complementary color light to extend the color reproduction range may be arranged in one pixel.

In the pixel array 110, scanning lines 211 and 212 are arranged for each pixel row in a row direction (the horizontal direction in FIG. 1) with respect to the array of the pixels 101 of m rows×n columns. A signal line 310 is arranged for each pixel column in a column direction (the vertical direction in FIG. 1). Each scanning line 211 is connected to an output terminal of the write scanning circuit 201 in a corresponding row. Each scanning line 212 is connected to an output terminal of the light emission drive scanning circuit 202 in a corresponding row. Each signal line 310 is connected to an output terminal of the signal output circuit 300 in a corresponding column.

The pixel array 110 may be formed on, for example, a transparent insulating substrate such as a glass substrate or plastic substrate. In this case, the pixels 101 of the pixel array 110 can be formed using, for example, a low-temperature polysilicon process. However, the present invention is not limited to this. For example, the pixels 101 may be formed using an oxide semiconductor process. For example, the pixel array 110 may be formed on a silicon substrate using a CMOS process.

The write scanning circuit 201 can be formed by a shift register that sequentially shifts (transfers) a start pulse in synchronism with a clock pulse. When writing video signals in the respective pixels 101 of the pixel array 110, the write scanning circuit 201 sequentially supplies a write scanning signal SEL to the scanning lines 211, thereby scanning the pixels 101 of the pixel array 110 on the row basis (line sequential scanning).

The light emission drive scanning circuit 202 can be formed by a shift register that sequentially shifts a start pulse in synchronism with a clock pulse. The light emission drive scanning circuit 202 supplies, to the scanning line 212, a light emission driving signal SW for performing light emission driving of the pixels 101, in synchronization with line sequential scanning by the write scanning circuit 201. The light emission driving signal SW controls light emission or non-light emission of the pixel 101.

The signal output circuit 300 outputs a luminance signal Vsig of a video signal corresponding to luminance information supplied from a signal supply source (not shown). As the signal output circuit 300, for example, a known time-division driving circuit arrangement can be used. A time-division driving method is also called a selector method, which assigns a unit (set) of a plurality signal lines to one output terminal of a driver (not shown) as a signal supply source. This is a method of driving each signal line 310 by time-divisionally, sequentially selecting the plurality of signal lines while time-divisionally distributing and supplying, to the selected signal line, video signals output in time series for each output terminal of the driver.

By exemplifying the pixel array 110 including red, green and blue sub-pixels (pixels 101), three pixel columns of red, green and blue adjacent to each other are set as a unit and video signals of red, green, and blue are supplied in time series from the driver to the signal output circuit 300 during one horizontal period. The signal output circuit 300 is formed by including a multiplexer provided in correspondence with the three pixel columns of red, green, and blue, and the multiplexer time-divisionally, sequentially performs an ON operation, thereby time-divisionally writing video signals of red, green and blue in the corresponding signal lines 310, respectively.

In the above description, the three pixel columns (signal lines) of red, green and blue are set as a unit. However, the present invention is not limited to this. By adopting the time-division driving method (selector method), the number of outputs of the driver and the number of wirings between the driver and the signal output circuit 300 can be decreased to 1/x of the number of signal lines when x represents the time-division number (x is an integer of 2 or more).

The luminance signal Vsig output from the signal output circuit 300 is written in the pixels 101 of the pixel array 110 via the signal lines 310 on the row basis.

Figure 2:
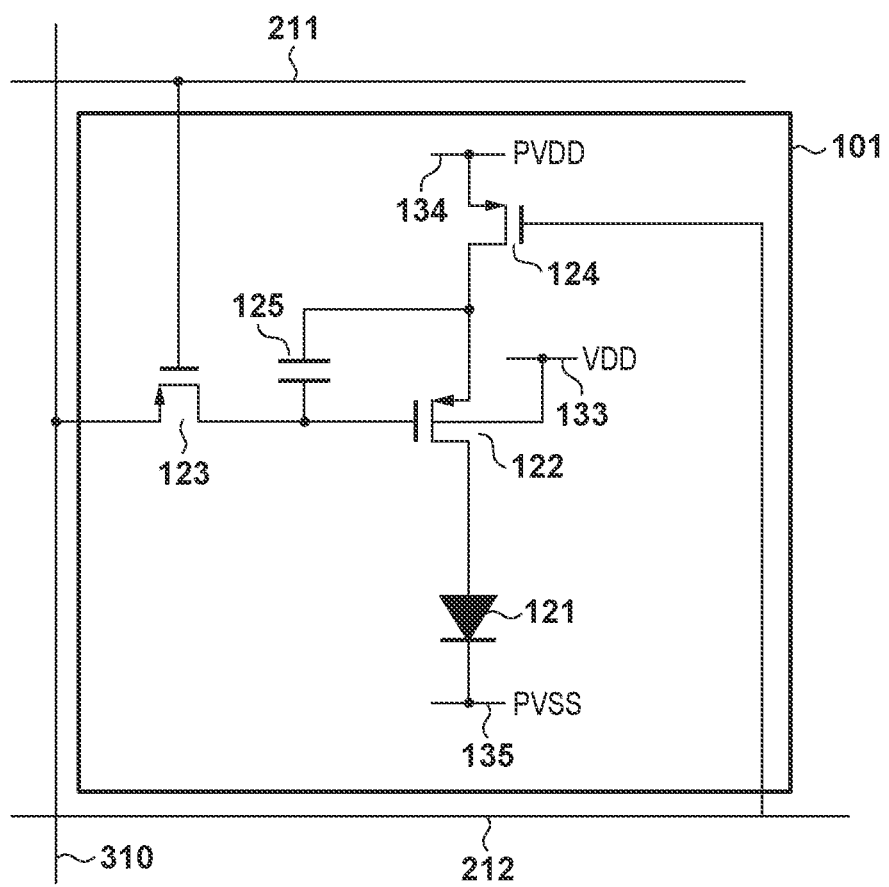
FIG. 2 is a circuit diagram showing an example of the arrangement of a pixel of the light emitting device shown in FIG. 1.

FIG. 2 is a circuit diagram showing an example of the arrangement of the pixel 101 used for the light emitting device 100 according to this embodiment. As shown in FIG. 2, in the pixel 101, a light emitting element 121 as a current-driven electro-optical element whose light emission luminance changes in accordance with the amount of a flowing current is arranged. The light emitting element 121 may be, for example, an organic electroluminescence (EL) element. In the pixel 101, a driving circuit that drives the light emitting element 121 is arranged.

The driving circuit includes a driving transistor 122, a write transistor 123, a light emission control transistor 124, and a capacitive element 125. The driving transistor 122 has one main terminal (drain electrode) connected to the light emitting element 121, and supplies, to the light emitting element 121, a current corresponding to the luminance signal Vsig. The write transistor 123 supplies the luminance signal Vsig to the control terminal (gate electrode) of the driving transistor 122. The light emission control transistor 124 is arranged between a supply line 134 for supplying a positive potential PVDD and the other main terminal (source electrode) of the driving transistor 122 different from the main terminal connected to the light emitting element 121, and controls light emission or non-light emission of the light emitting element 121. The capacitive element 125 is arranged between the control terminal of the driving transistor 122 and the main terminal (source electrode) of the driving transistor 122 connected to the light emission control transistor 124. A terminal (cathode electrode) not connected to the main terminal (drain electrode) of the driving transistor 122 out of the two terminals of the light emitting element 121 is connected to a supply line 135 for supplying a negative potential PVSS, which is common to all the pixels 101.

In the arrangement shown in FIG. 2, a p-channel transistor is used as the driving transistor 122. P-channel transistors are also used as the write transistor 123 and the light emission control transistor 124. However, a combination of the conductive types of the write transistor 123 and the light emission control transistor 124 is not limited to this. An n-channel transistor may be used for one or both of the write transistor 123 and the light emission control transistor 124.

The driving transistor 122 is series-connected to the light emitting element 121 to supply, to the light emitting element 121, a current (driving current) corresponding to the luminance signal Vsig. One main terminal (drain electrode) of the driving transistor 122 is connected to a terminal (anode electrode) of the light emitting element 121. The back gate terminal of the driving transistor 122 is connected to a supply line 133 for supplying a positive potential VDD. That is, the back gate terminal of the driving transistor 122 is supplied with the potential VDD.

It is considered here that the potential VDD supplied to the back gate terminal of the driving transistor 122 and the potential PVDD supplied from the supply line 134 to the light emission control transistor 124 are different from each other. However, the present invention is not limited to this, and the potentials PVDD and VDD may be the same. If the potential VDD supplied to the back gate terminal of the driving transistor 122 is set to be the same as the potential PVDD, the supply line 133 for supplying the potential VDD to each pixel 101 need not be arranged, thereby making it possible to reduce a wiring pattern. Furthermore, a circuit for generating the potential VDD is not required, thereby contributing to reduction of the circuit scale of the peripheral circuit. However, the potential supplied to the back gate terminal is not limited to this. For example, a potential may externally be supplied in a form of a control signal for each row so that different potentials are input at the time of light emission and at the time of threshold voltage correction operation to be described later.

If the driving transistor 122 is created on an insulator such as a glass substrate or a plastic substrate, it is necessary to create a back gate terminal by a conductor such as a metal. On the other hand, for example, if the driving transistor 122 is created on a substrate using a conductor or an Si substrate, a back gate terminal can be implemented by applying a potential to the substrate.

In the write transistor 123, the control terminal (gate electrode) is connected to the scanning line 211, one of the two main terminals is connected to the signal line 310, and the other main terminal is connected to the control terminal of the driving transistor 122. The control terminal of the write transistor 123 is supplied with the write scanning signal SEL from the write scanning circuit 201 via the scanning line 211.

In the light emission control transistor 124, the control terminal (gate electrode) is connected to the scanning line 212, one (source electrode) of the two main terminals is connected to the supply line 134 for supplying the potential PVDD, and the other main terminal (drain electrode) is connected to the main terminal (source electrode) of the driving transistor 122 not connected to the light emitting element 121. The control terminal of the light emission control transistor 124 is supplied with the light emission driving signal SW from the light emission drive scanning circuit 202 via the scanning line 212.

The write transistor 123 is set in a conductive state in response to the write scanning signal SEL applied from the write scanning circuit 201 to the control terminal via the scanning line 211. This causes the write transistor 123 to sample the potential (luminance signal Vsig) of the video signal corresponding to luminance information supplied from the signal output circuit 300 via the signal line 310, and write it in the pixel 101. The written luminance signal Vsig is applied to the control terminal of the driving transistor 122 and is also held in the capacitive element 125.

The driving transistor 122 receives supply of a current, via the light emission control transistor 124, from the supply line 134 for supplying the potential PVDD, and executes light emission driving of the light emitting element 121 by current driving. More specifically, the driving transistor 122 supplies, to the light emitting element 121, a driving current of a current value corresponding to the value of the luminance signal Vsig held in the capacitive element 125, thereby current-driving the light emitting element 121 to emit light.

The light emission control transistor 124 is set in a conductive state in response to the light emission driving signal SW applied from the light emission drive scanning circuit 202 to the gate electrode via the scanning line 212, thereby supplying a current from the potential PVDD to the driving transistor 122. This allows the driving transistor 122 to execute light emission driving of the light emitting element 121, as described above. That is, the light emission control transistor 124 has the function of a switch for controlling light emission or non-light emission of the light emitting element 121.

As described above, the switching operation of the light emission control transistor 124 can provide a period (non-light emission period) during which the light emitting element 121 is in a non-light emission state, and control the ratio between the non-light emission period and a light emission period of the light emitting element 121 (so-called duty control). The duty control can reduce afterimage blurring accompanying light emission from the pixel 101 over a period of one frame. Therefore, it is possible to further improve image quality especially when displaying a moving image.

Next, the circuit operation of the light emitting device 100 including the above-described pixel 101 will be described with reference to a timing chart shown in FIG. 3 and explanatory views of the operations shown in FIGS. 4A to 4F. The timing chart of FIG. 3 shows changes in the write scanning signal SEL, the light emission driving signal SW, the potential (to be sometimes referred to as a source potential Vs hereinafter) of the main terminal (source electrode) connected to the light emission control transistor 124 out of the two main terminals of the driving transistor 122, and the potential (to be sometimes referred to as a gate potential Vg hereinafter) of the control terminal (gate electrode). The explanatory views of the operations of FIGS. 4A to 4F show the write transistor 123 and the light emission control transistor 124 as "switches" for the sake of simplicity.

In the timing chart of FIG. 3, a period before time t1 indicates the light emission period of the light emitting element 121 for a frame immediately before a frame of interest. During the light emission period for the preceding frame, the light emission driving signal SW is in an active state (low-potential state), and thus the light emission control transistor 124 is in the conductive (ON) state. At this time, the write scanning signal SEL is in an inactive state (high-potential state), and the write transistor 123 is in a non-conductive (OFF) state.

At this time, as shown in FIG. 4A, a driving current Ids corresponding to a gate-source voltage Vgs of the driving transistor 122 is supplied from the supply line 134, for supplying the potential PVDD, to the light emitting element 121 via the driving transistor 122. Thus, the light emitting element 121 emits light with luminance corresponding to the current value of the driving current Ids.

Next, at time t1, a new frame (frame of interest) for line sequential scanning starts. At time t1, the light emission driving signal SW is set in an inactive state, and thus the light emission control transistor 124 is set in a non-conductive state, as shown in FIG. 4B. This stops supplying the current from the supply line 134, for supplying the potential PVDD, to the light emitting element 121 via the driving transistor 122. Thus, the light emitting element 121 emits no light and the non-light emission period for the frame of interest starts.

If no current is supplied to the light emitting element 121, the anode potential of the light emitting element 121 converges to a potential Vthel+Vcath which is the sum of a threshold voltage Vthel and a cathode potential Vcath of the light emitting element 121. At this time, the write transistor 123 and the light emission control transistor 124 are maintained in the non-conductive state.

At time t2 after a predetermined time elapses since time t1, the signal output circuit supplies, to the signal line 310, the luminance signal Vsig having a voltage reflecting gradation. FIG. 3 shows a case in which the gradation value of a row of interest is equal to that of a row supplied with the luminance signal Vsig immediately before the row of interest, and the luminance signal Vsig remains the same with respect to the row supplied with the luminance signal Vsig immediately before the row of interest.

Next, a write period during which the write transistor 123 is rendered conductive and the luminance signal Vsig is written in the control terminal of the driving transistor 122 starts. During the write period, in a threshold correction preparation period starting from time t3, the write scanning signal SEL is set in the active state and the write transistor 123 is set in the conductive state. This writes the luminance signal Vsig of the signal line 310 in the control terminal of the driving transistor 122 via the write transistor 123, as shown in FIG. 4C.

Next, at time t4 when the write transistor 123 in in the ON state, the light emission driving signal SW is set in the active state, and the light emission control transistor 124 is set in the conductive state, as shown in FIG. 4D. When the light emission control transistor 124 is rendered conductive, the supply line 134 for supplying the potential PVDD supplies a current to the driving transistor 122, and a current flows to the driving transistor 122 in response to the gate-source voltage Vgs of the driving transistor 122.

At this time, a difference |PVDD−Vsig| between the luminance signal Vsig and the potential PVDD is large when the light emission luminance of the light emitting element 121 is high, and is small when the light emission luminance is low. Therefore, the current flowing to the driving transistor 122 at time t4 reflects the light emission luminance of the light emitting element 121. For example, if the organic EL element emits no light during the light emission period for the frame of interest, the difference |PVDD−Vsig| is equal to or lower than the threshold voltage of the driving transistor 122. Therefore, no current flows to the driving transistor 122. That is, in this case, no current flows from the driving transistor 122 to the light emitting element 121, and thus the light emitting element 121 emits no light. On the other hand, if the light emitting element 121 emits light, the difference |PVDD−Vsig| is higher than the threshold voltage of the driving transistor 122.

Next, at time t5, the light emission driving signal SW transitions from the active state to the inactive state, and the light emission control transistor 124 is set in the non-conductive state. At this time, if the difference |PVDD−Vsig| is large, a current flows through a path of the capacitive element 125 the driving transistor 122→the light emitting element 121, as shown in FIG. 4E (an alternate long and short dashed line in FIG. 4E).

Thus, in the state in which the luminance signal Vsig is input to the control terminal of the driving transistor 122, threshold voltage correction processing of changing the source potential Vs in a direction in which the gate-source voltage Vgs of the driving transistor 122 decreases is performed. The change in the source potential Vs of the driving transistor 122 is as shown in the timing chart of FIG. 3. As the threshold voltage correction processing progresses from time t5, the source potential Vs of the driving transistor 122 lowers from the potential PVDD. This correction processing decreases the gate-source voltage Vgs of the driving transistor 122, and also changes the difference between the source potential Vs and the potential (to be sometime referred to as a back gate potential Vb hereinafter) of the back gate terminal of the driving transistor 122.

In general, the threshold voltage of the transistor changes depending on the difference between the back gate potential Vb and the source potential Vs. More specifically, in the case of the p-channel transistor, if the back gate potential Vb is lower than the source potential Vs, the absolute value of the threshold voltage is shifted to the negative side, and if the back gate potential Vb is higher than the source potential Vs, the absolute value of the threshold voltage is shifted to the positive side.

In the operation shown in FIG. 3, along with the threshold voltage correction processing, the source potential Vs decreases from the potential PVDD, and thus the difference Vb−Vs between the back gate potential Vb and the source potential Vs increases with time. Therefore, along with a decrease in the source potential Vs, the absolute value of the threshold voltage of the driving transistor 122 is shifted more to the positive side. After a predetermined time elapses, the gate-source voltage Vgs of the driving transistor 122 converges to the threshold voltage |Vth+ΔV| considering the back gate potential Vb, and the value is held in the capacitive element 125. In this case, the potential Vth indicates the threshold voltage of the driving transistor 122 when the light emitting element 121 emits light, that is, when the source potential of the driving transistor 122 is the potential PVDD and the back gate potential is the potential VDD. The potential ΔV indicates the shift amount of the threshold voltage caused by the difference between the source potential Vs and the back gate potential Vb at the time of the operation of the threshold voltage correction processing.

Consider now the potential ΔV. The potential ΔV is a value determined based on the difference between the source potential Vs and the back gate potential Vb of the driving transistor 122 at the time of the operation of the threshold voltage correction processing, as described above but the source potential Vs of the driving transistor 122 at the time of the operation of the threshold voltage correction processing is determined mainly based on the gate potential Vg. That is, it can be said that the potential ΔV is determined based on the gate potential Vg and the back gate potential Vb. In other words, the potential ΔV is a value reflecting the luminance signal Vsig.

The threshold voltage correction processing ends at time t6 when the write scanning signal SEL transitions from the active state to the inactive state and the write transistor 123 is set in the OFF state. The period of the threshold voltage correction processing from time t5 to time t6 may be longer than a period during which the write transistor 123 and the light emission control transistor 124 are both in the ON state to make the gate-source voltage Vgs of the driving transistor 122 converge to the voltage |Vth+ΔV|, as described above. That is, in the write period (from time t3 to time t6) during which the write transistor 123 is rendered conductive and the luminance signal Vsig is written in the control terminal of the driving transistor 122, the length of the period (from time t5 to time t6) from when the light emission control transistor 124 changes from the conductive state to the non-conductive state until the write period ends may be longer than the length of the period (from time t4 to time t5) during which the light emission control transistor 124 is rendered conductive.

At time t7 after a predetermined time elapses since time t6, the light emission driving signal SW transitions from the inactive state to the active state, and the light emission control transistor 124 is rendered conductive. If the light emission control transistor 124 is set in the conductive state, the supply line 134 for supplying the potential PVDD supplies a current to the driving transistor 122.

When the light emission control transistor 124 is set in the conductive state, the source potential Vs of the driving transistor 122 changes to the potential PVDD, and thus the absolute value of the threshold voltage of the driving transistor 122 changes to the potential Vth. Therefore, the value |Vth+ΔV| held in the capacitive element 125 becomes a value larger than the absolute value of the potential Vth which is the threshold voltage of the driving transistor 122 when the light emission control transistor 124 is rendered conductive. As described above, since ΔV is the value reflecting the luminance signal Vsig, the driving transistor 122 supplies, to the light emitting element 121, a current Ids' corresponding to the gate-source voltage Vgs, as shown in FIG. 4F. This causes the light emitting element 121 to emit light and the light emission period for the frame of interest starts.

As described above, one frame period for displaying one image includes a write period during which the write transistor 123 is rendered conductive and the luminance signal Vsig is written in the control terminal of the driving transistor 122, and a light emission period during which, after the write period, the light emission control transistor 124 changes from the non-conductive state to the conductive state and the light emitting element 121 emits light corresponding to the luminance signal Vsig. The light emission control transistor 124 is rendered conductive after the start of the write period and before the end of the write period. This allows the driving circuit of the pixel 101 to correct, by a small number of elements, that is, three transistors and one capacitive element, a variation in the threshold voltage of the driving transistor 122 for each pixel 101. As a result, it is possible to obtain satisfactory image quality without any luminance variation such as unevenness or streaks caused by a variation in the threshold voltage of the driving transistor 122. Furthermore, since the luminance signal Vsig is input to the control terminal of the driving transistor 122 and the threshold voltage correction processing is performed, the reference potential used in threshold correction described in Japanese Patent Laid-Open No. 2010-145579 is not required. Therefore, it is possible to decrease the circuit scale of the signal output circuit 300. In addition, it is possible to reduce electric power necessary to charge/discharge the signal line 310, which is caused by alternate supply of the reference potential and the luminance signal Vsig (signal potential). Therefore, the power consumption of the light emitting device 100 can be reduced. In addition, since the number of transistors and the number of capacitive elements arranged in the pixel 101 are small, if, for example, the area of the pixel 101 needs to be reduced due to the high-resolution of the pixel array 110, it can be easy to design the pixel layout. As shown in FIG. 3, in the write period, after the light emission control transistor 124 changes from the conductive state to the non-conductive state, the write transistor 123 may be rendered conductive and the luminance signal Vsig may be written in the control terminal of the driving transistor 122. However, the present invention is not limited to this. After the write transistor 123 is rendered conductive, the light emission control transistor 124 may change from the conductive state to the non-conductive state. With this operation as well, the above-described effect is obtained.

In black display, during the threshold correction preparation period from time t3 to time t5, the gate-source voltage Vgs of the driving transistor 122 can be set low. Therefore, during the period of the threshold voltage correction processing from time t5 to time t6, the current flowing to the light emitting element 121 can be made small. It is thus possible to suppress the occurrence of a phenomenon such as fading of a black color, thereby obtaining the light emitting device 100 with high contrast.

Figure 5:
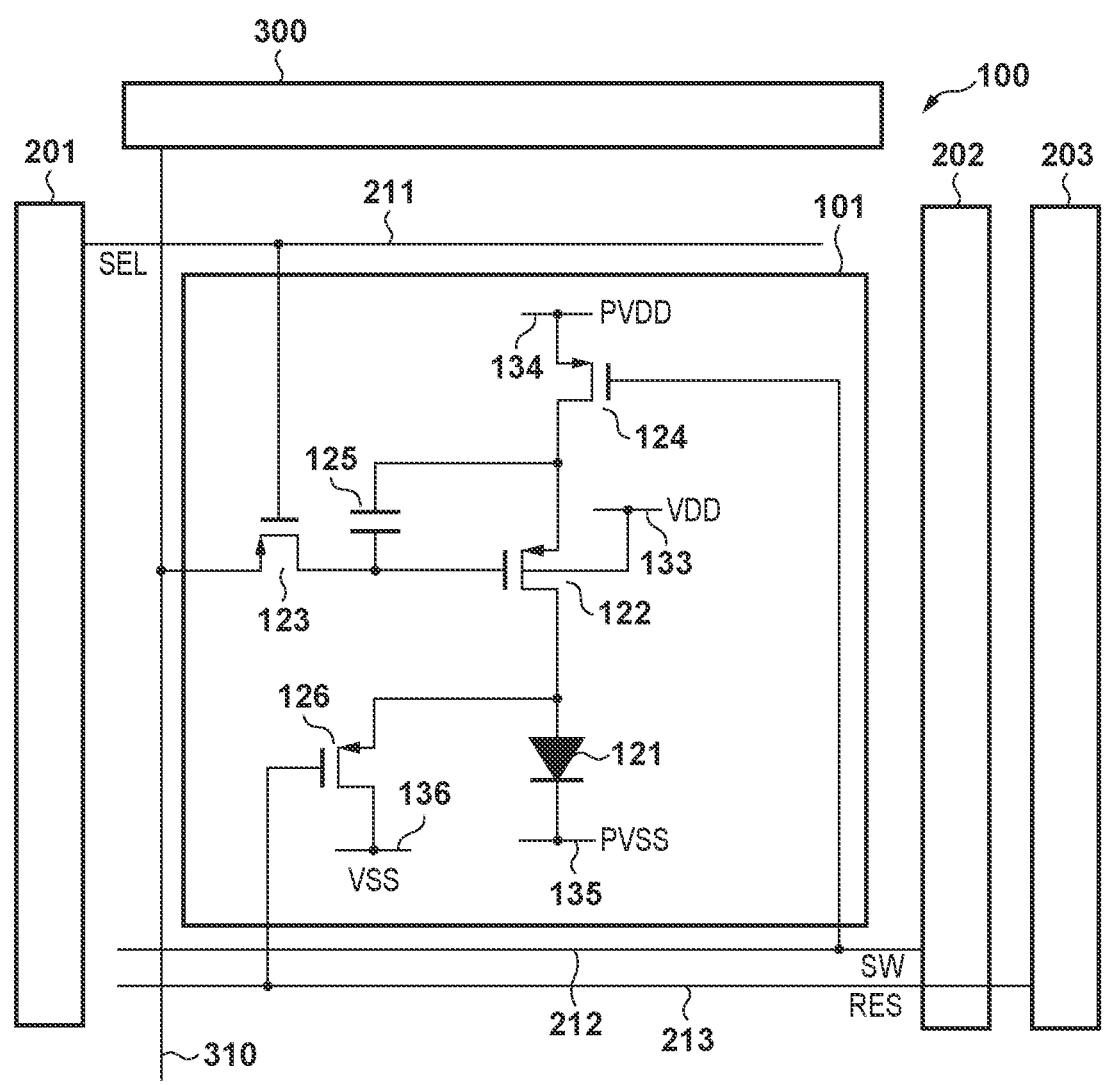
FIG. 5 is a circuit diagram showing a modification of the pixel shown in FIG. 2.

FIG. 5 is a view showing a modification of the light emitting device 100 shown in FIG. 1 and the pixel 101 shown in FIG. 2. In an arrangement shown in FIG. 5, a scanning line 213 is arranged from an initialization scanning circuit 203 for each pixel row. Each scanning line 213 is connected to the output terminal of the initialization scanning circuit 203 in a corresponding row.

The initialization scanning circuit 203 can be formed by a shift register that sequentially shifts a start pulse in synchronism with a clock pulse. In synchronism with line sequential scanning by the write scanning circuit 201, the initialization scanning circuit 203 supplies, to the scanning line 213, an initialization scanning signal RES for resetting a terminal (anode electrode) connected to the main terminal (drain electrode) of the driving transistor 122 out of the two terminals of the light emitting element 121. With the initialization scanning signal RES, the initialization operation of the anode electrode of the light emitting element 121 is performed.

To perform the initialization operation, the pixel 101 includes a reset transistor 126 that resets, to a predetermined potential VSS, the terminal (anode electrode) connected to the main terminal of the driving transistor 122 out of the two terminals of the light emitting element 121, as shown in FIG. 5. In the arrangement shown in FIG. 5, a p-channel transistor is used as the reset transistor 126. However, the present invention is not limited to this, and an n-channel transistor may be used as the reset transistor 126 in accordance with the arrangement of the write transistor 123, the light emission control transistor 124, and the like.

In the reset transistor 126, a control terminal (gate electrode) is connected to the scanning line 213, one of the two main terminals is connected to the anode electrode of the light emitting element 121, and the other main terminal is connected to a supply line 136 for supplying the predetermined potential VSS. In this example, when the threshold voltage of the light emitting element 121 is the voltage Vthel, and the cathode potential of the light emitting element 121 (the potential PVSS of the supply line 135) is Vcath, the potential VSS of the supply line 136 is set to satisfy a condition of VSS<Vthel+Vcath. Thus, if the reset transistor 126 is set in a conductive state, the potential of the anode electrode of the light emitting element 121 can be set to a potential at which the light emitting element 121 emits no light.

At this time, consider a case in which the potential PVSS supplied by the supply line 135 and the potential VSS supplied from the supply line 136 to the reset transistor 126 are different from each other. However, the present invention is not limited to this, and the potentials PVSS and VSS may be the same. That is, the potential PVSS supplied to the terminal (cathode electrode) not connected to the main terminal of the driving transistor 122 out of the two terminals of the light emitting element may be the same as the potential VSS supplied to the reset transistor 126. If the potential VSS is set to be the same as the potential PVSS, the supply line 136 for supplying the potential VSS to each pixel 101 need not be arranged, thereby making it possible to reduce a wiring pattern. Furthermore, a circuit for generating the potential VSS is not required, thereby contributing to reduction of the circuit scale of the peripheral circuit.

In the non-light emission period shown in FIG. 3, before the write period (from time t3 to time t6) during which the luminance signal Vsig is input to the control terminal of the driving transistor 122, the reset transistor 126 is set in the conductive state, and the negative potential VSS is written in the anode electrode of the light emitting element 121. That is, during the write period, the reset transistor 126 may be in the conductive state. With this operation, the potential of the anode electrode of the light emitting element 121 is set to the potential VSS during the operation of threshold correction preparation and threshold voltage correction processing. Therefore, no current flows to the light emitting element 121, and a phenomenon such as so-called fading of a black color does not occurs in black display. As a result, satisfactory contrast can be obtained.

As described above, in the arrangement shown in FIG. 5, one transistor is added to the pixel 101, as compared with the arrangement shown in FIG. 2. Furthermore, by arranging the reset transistor 126, the scanning line 213 and the initialization scanning circuit 203 are added, as compared with the arrangement shown in FIG. 1. However, similar to the above-described arrangement, it is possible to input the luminance signal Vsig to the control terminal of the driving transistor 122 and to perform threshold voltage correction processing. Therefore, the reference potential used in threshold correction described in Japanese Patent Laid-Open No. 2010-145579 is not required. Therefore, it is possible to decrease the circuit scale of the signal output circuit 300. In addition, it is possible to reduce electric power necessary to charge/discharge the signal line 310, which is caused by alternate supply of the reference potential and the luminance signal Vsig (signal potential). Therefore, the power consumption of the light emitting device 100 can be reduced. Furthermore, the reset transistor 126 can suppress fading of a black color during the write period, thereby improving the image quality of an image displayed by the light emitting device 100.

Figure 6:
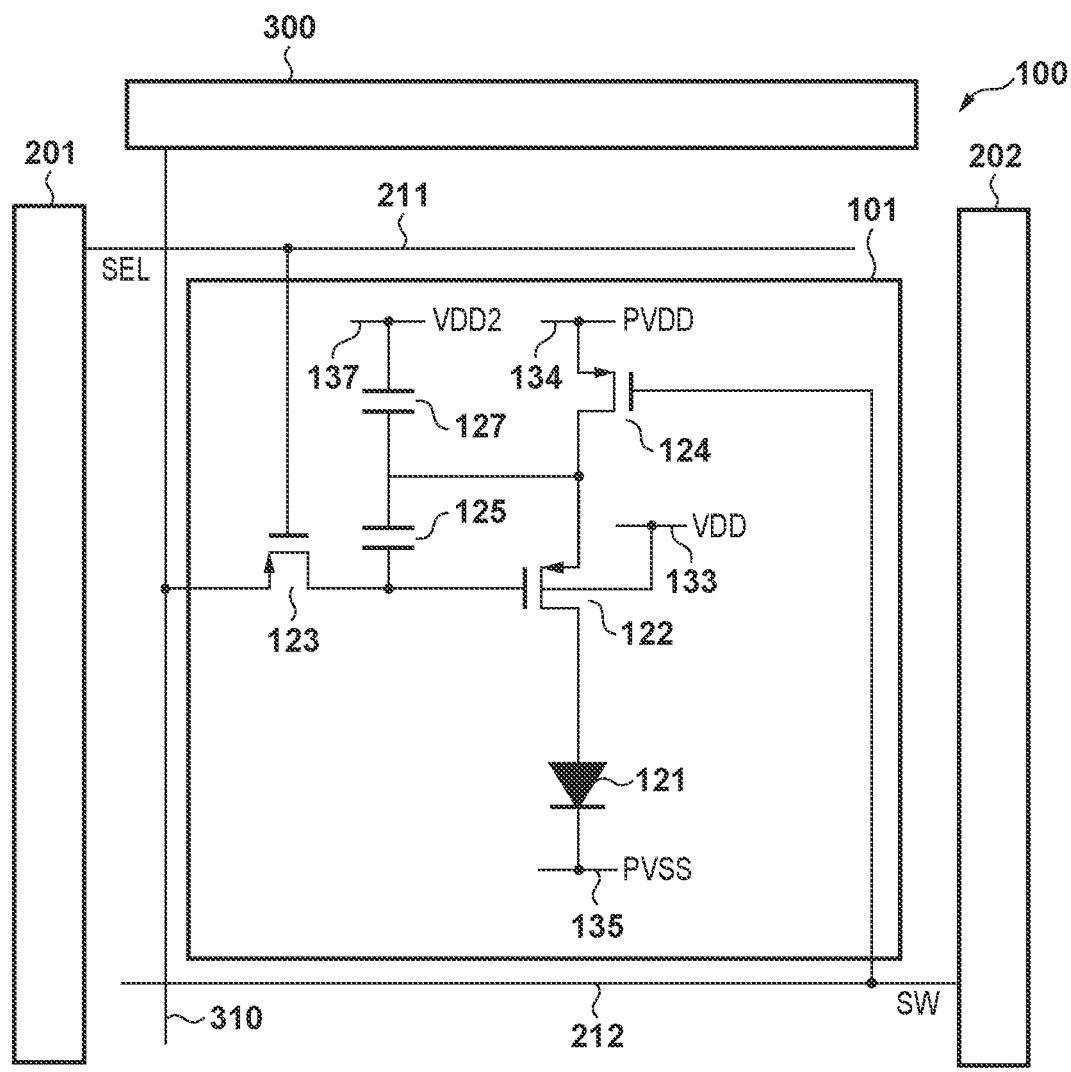
FIG. 6 is a circuit diagram showing a modification of the pixel shown in FIG. 2.

FIG. 6 is a view showing a modification of the light emitting device 100 shown in FIG. 1 and the pixel 101 shown in FIG. 2. In an arrangement shown in FIG. 6, the pixel 101 further includes an additional capacitive element 127 arranged between the capacitive element 125 and a supply line 137 for supplying a potential VDD2.

Consider a case in which the potential VDD2 supplied from the supply line 137 and the potential PVDD supplied from the supply line 134 to the light emission control transistor 124 are different from each other. However, the present invention is not limited to this, and the potentials PVDD and VDD2 may be the same. If the potential VDD2 is set to be the same as the potential PVDD or VDD, the supply line 137 for supplying the potential VDD2 to each pixel 101 need not be arranged, thereby making it possible to reduce a wiring pattern. Furthermore, a circuit for generating the potential VDD2 is not required, thereby contributing to reduction of the circuit scale of the peripheral circuit.

By arranging the capacitive element 127, the change in the source potential Vs of the driving transistor 122 at the time of the operation of threshold voltage correction processing can be made moderate. Furthermore, since, after the end of the operation of the threshold voltage correction processing, the source potential Vs of the driving transistor 122 is held in the capacitive element 127 during a period (from time t6 to time t7) in which the light emission control transistor 124 is OFF, for example, it is possible to suppress the influence of noise from a power supply wiring on the source potential of the driving transistor 122.

As described above, in the arrangement shown in FIG. 6, one capacitive element is added to the pixel 101, as compared with the arrangement shown in FIG. 2. However, similar to the above-described arrangement, it is possible to input the luminance signal Vsig to the control terminal of the driving transistor 122 and to perform threshold voltage correction processing. Therefore, similar to each of the above-described embodiments, the power consumption of the light emitting device 100 can be reduced. As described above, the noise resistance of the luminance signal Vsig is improved, thereby improving the image quality of an image displayed by the light emitting device 100.

Figure 7:
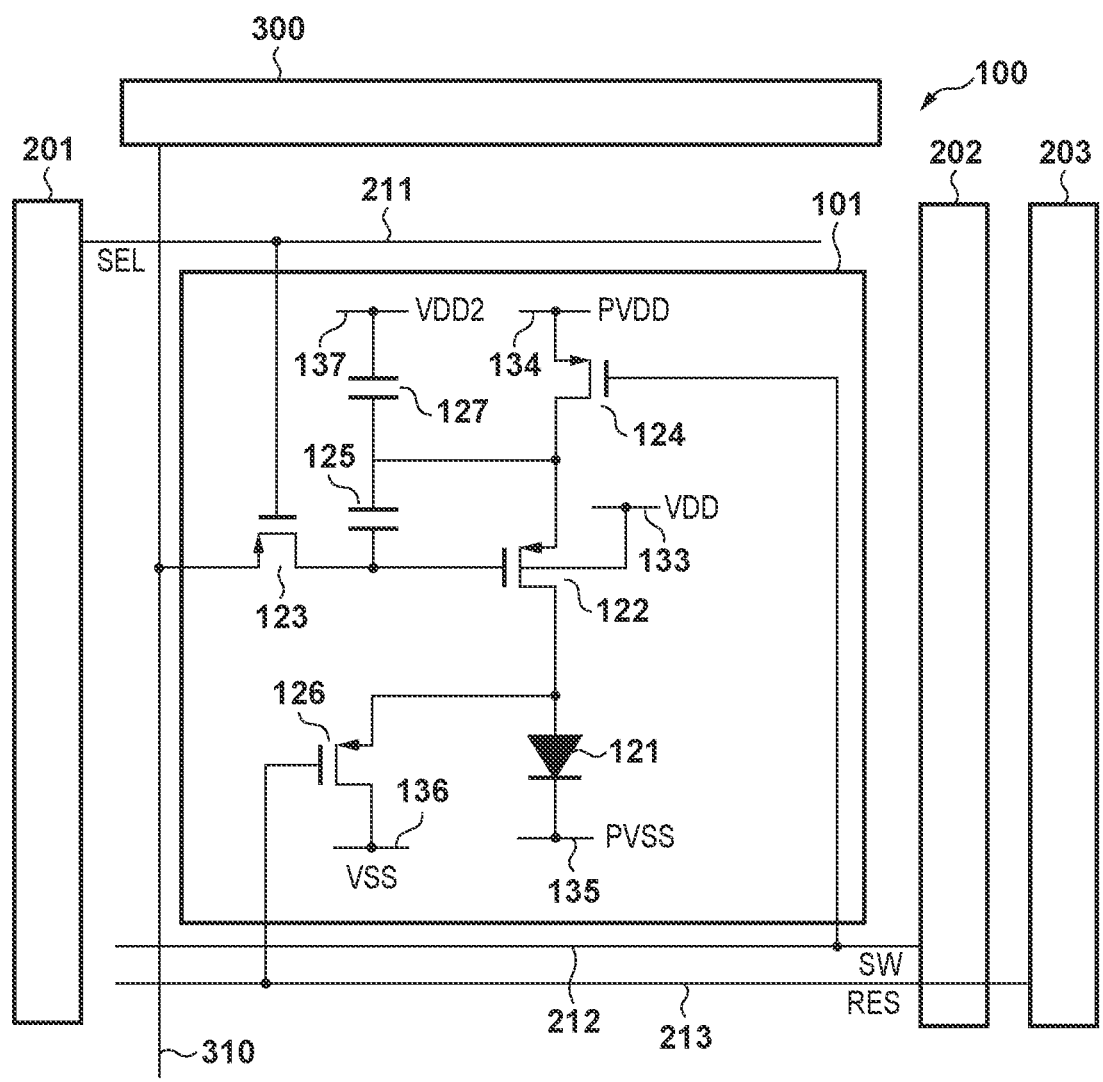
FIG. 7 is a circuit diagram showing a modification of the pixel shown in FIG. 2.

FIG. 7 is a view showing a modification of the light emitting device 100 shown in FIG. 1 and the pixel 101 shown in FIG. 2. As shown in FIG. 7, the reset transistor 126 and the capacitive element 127 described with reference to FIG. 5 may be arranged in the pixel 101. Even if the pixel 101 has the arrangement shown in FIG. 7, it is possible to input the luminance signal Vsig to the control terminal of the driving transistor 122 and to perform threshold voltage correction processing, similar to each of the above-described arrangements. Therefore, similar to each of the above-described embodiments, the power consumption of the light emitting device 100 can be reduced. Furthermore, the reset transistor 126 suppresses fading of a black color during the write period, and the capacitive element 127 improves the noise resistance of the luminance signal Vsig, thereby improving the image quality of an image displayed by the light emitting device 100.

FIG. 8 is a timing chart showing a modification of the timing of the circuit operation of the light emitting device 100 shown in FIG. 3. The pixel 101 may have any of the arrangements shown in FIGS. 2 and 5 to 7. Assume here that the pixels 101 having the arrangement shown in FIG. 2 are arranged in the light emitting device 100.

In the timing chart shown in FIG. 8, after the end of a write period (from time t3 to time t6) and before the start of a light emission period indicated by time t9, the write transistor 123 is rendered conductive again and the luminance signal Vsig is written in the control terminal of the driving transistor 122. That is, during a period from time t7, after a predetermined time elapses since the end of the period of threshold voltage correction processing, to time t8, an operation in which the write transistor 123 transitions from the non-conductive state to the conductive state and the luminance signal Vsig is written in the control terminal of the driving transistor 122 is added.

Figures 9A, 9B:
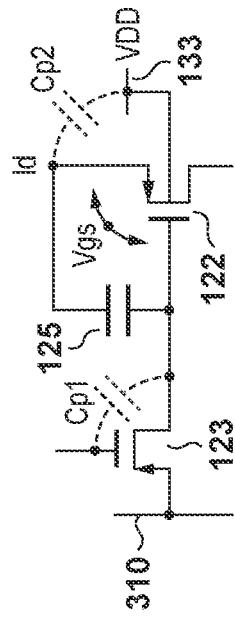
FIG. 9A is a circuit diagram showing the parasitic capacitances of a driving transistor and a write transistor of the pixel shown in FIG. 2.
FIG. 9B is a table showing the gate-source voltage of the driving transistor of the pixel shown in FIG. 2.

The effect of the additional write operation will be described. The threshold voltage correction processing ends when the write scanning signal SEL transitions from the active state to the inactive state at time t6, and the write transistor 123 is set in the non-conductive state, as described above. At this time, as shown in FIG. 9A, a change in the potential of the write scanning signal SEL changes the potential (gate potential Vg) of the control terminal of the driving transistor 122 via a parasitic capacitance Cp1 of the write transistor 123. The change in the potential is larger as the change in the potential of the write scanning signal SEL is steeper. Therefore, as shown in FIG. 9B, the change in the gate potential Vg of the driving transistor 122 is large on a side of the pixel array 110 closer to the write scanning circuit 201 (the left side in FIG. 1, which will sometimes be referred to as a near end side hereinafter), and is small on a far side (the right side in FIG. 1, which will sometimes be referred to as a far end side hereinafter).

The capacitive element 125 is connected between the gate and source of the driving transistor 122, and the change in the gate potential Vg of the driving transistor 122 is input to the source potential Vs via the capacitive element 125. At this time, since a parasitic capacitance Cp2 exists in the source electrode of the driving transistor 122 with respect to, for example, the back gate terminal, the gate-source voltage Vgs of the driving transistor 122 changes due to the change in the potential of the write scanning signal SEL. If the write transistor 123 is a p-channel transistor, the potential of the write scanning signal SEL changes from a low potential to a high potential, and thus the gate-source voltage Vgs of the driving transistor 122 becomes low. On the other hand, if the write transistor 123 is an n-channel transistor, the potential of the write scanning signal SEL changes from a high potential to a low potential, and thus the gate-source voltage Vgs of the driving transistor 122 becomes high.

With this operation, a small current corresponding to the changed gate-source voltage Vgs of the driving transistor 122 flows to the driving transistor 122. This current is different between the near end side and the far end side in the pixel array 110, as described above. For example, if the write transistor 123 is a p-channel transistor, the gate-source voltage Vgs of the driving transistor 122 on the near end side is lower than the gate-source voltage Vgs of the driving transistor 122 on the far end side. Therefore, the current flowing through the driving transistor 122 on the near end side is smaller than the current flowing through the driving transistor 122 on the far end side. This current causes the gate-source voltage Vgs of the driving transistor 122 to moderately lower from time t6, and the decrease amount is larger on the far end side than on the near end side.

At time t7 after the predetermined time elapses, the write scanning signal SEL transitions from the inactive state to the active state, and the write transistor 123 is set in the conductive state, thereby inputting the luminance signal Vsig to the control terminal of the driving transistor 122 again. At this time, since the gate-source voltage Vgs of the driving transistor 122 lowers due to the above-described current, the gate potential Vg of the driving transistor 122 changes to the signal potential Vsig, and the change amount of the potential is input to the source electrode via the capacitive element 125. At this time, since the parasitic capacitance Cp2 exists in the source electrode of the driving transistor 122 with respect to, for example, the back gate terminal, this operation changes the gate-source voltage Vgs of the driving transistor 122. This change amount is large if the gate potential Vg of the driving transistor 122 immediately before the write transistor 123 is rendered conductive is low, and is thus large on the far end side on which the decrease amount of the gate potential Vg of the driving transistor 122 caused by the current is large.

After that, at time t8, the write scanning signal SEL transitions from the active state to the inactive state, the write transistor 123 is set in the non-conductive state, and then the gate-source voltage Vgs of the driving transistor 122 changes, similar to time t6. The change amount changes in a direction in which the gate-source voltage Vgs of the driving transistor 122 decreases on the near end side. However, since the gate-source voltage Vgs is lower on the far end side at time t7, the change amount changes at time t8 in a direction in which the difference decreases, and the gate-source voltage Vgs of the driving transistor 122 is almost constant between the near end side and the far end side, as a whole.

During the period of the threshold voltage correction processing from time t5 to time t6, the gate-source voltage Vgs of the driving transistor 122 is made to converge to the voltage |Vth+ΔV|, as described above. To do this, this period is longer than a period from time t4 to time t5 during which both the write transistor 123 and the light emission control transistor 124 are in the conductive state. On the other hand, the write period from time t7 to time t8 of the luminance signal Vsig may be shorter than the period of the threshold voltage correction processing since the operation of inputting the luminance signal Vsig to the control terminal of the driving transistor 122 is performed. The length of the period (from time t7 to time t8) during which the write transistor 123 is rendered conductive again after the end of the write period (from time t3 to time t6) and before the start of the light emission period may be shorter than the length of the write period.

Even if the operation shown in FIG. 8 is performed, the light emitting device 100 can input the luminance signal Vsig to the control terminal of the driving transistor 122 and execute the threshold voltage correction processing, similar to each of the above-described arrangements. Therefore, similar to each of the above-described embodiments, it is possible to reduce the power consumption of the light emitting device 100.

Furthermore, after the operation of the threshold voltage correction processing, the write transistor 123 is rendered conductive again before the light emission period starts. This can correct the difference in the gate-source voltage Vgs of the driving transistor 122, caused by the change in the potential of the write scanning signal SEL, between the near end side and far end side of the pixel array 110. As a result, a luminance variation such as shading can be suppressed, thereby improving the image quality of an image displayed by the light emitting device 100.

In the above description, the operation shown in FIG. 8 is applied to not only the light emitting device 100 in which the pixels 101 having the arrangement shown in FIG. 2 are arranged in the pixel array 110. The operation shown in FIG. 8 can be applied to the light emitting device 100 in which the pixels 101 having each of the arrangements described with reference to FIGS. 5 to 7 are arranged in the pixel array 110.

The organic EL element has been exemplified as the light emitting element 121 but the light emitting element 121 is not limited to this. The light emitting element 121 can be applied to the general light emitting device using a current-driven electro-optical element (light emitting element) whose light emission luminance changes in accordance with the value of a current flowing through the element, such as an inorganic EL element, an LED element, or a semiconductor laser element.

Application examples in which the light emitting device 100 according to this embodiment is applied to a display device, a photoelectric conversion device, an electronic apparatus, an illumination device, a moving body, and a wearable device will be described here with reference to FIGS. 10 to 16A and 16B.

FIG. 10 is a schematic view showing an example of the display device using the light emitting device 100 of this embodiment. A display device 1000 can include a touch panel 1003, a display panel 1005, a frame 1006, a circuit board 1007, and a battery 1008 between an upper cover 1001 and a lower cover 1009. Flexible printed circuits (FPCs) 1002 and 1004 are respectively connected to the touch panel 1003 and the display panel 1005. Active elements such as transistors are arranged on the circuit board 1007. The battery 1008 is unnecessary if the display device 1000 is not a portable apparatus. Even when the display device 1000 is a portable apparatus, the battery 1008 need not be provided at this position. The light emitting device 100 according to this embodiment can be applied to the display panel 1005. The display region of the light emitting device 100 functioning as the display panel 1005 is connected to the active elements such as transistors arranged on the circuit board 1007 and operates.

The display device 1000 shown in FIG. 10 can be used for a display unit of a photoelectric conversion device (image capturing device) including an optical unit having a plurality of lenses, and an image sensor for receiving light having passed through the optical unit and photoelectrically converting the light into an electric signal. The photoelectric conversion device can include a display unit for displaying information acquired by the image sensor. In addition, the display unit can be either a display unit exposed outside the photoelectric conversion device, or a display unit arranged in the finder. The photoelectric conversion device can be a digital camera or a digital video camera.

Figure 11:
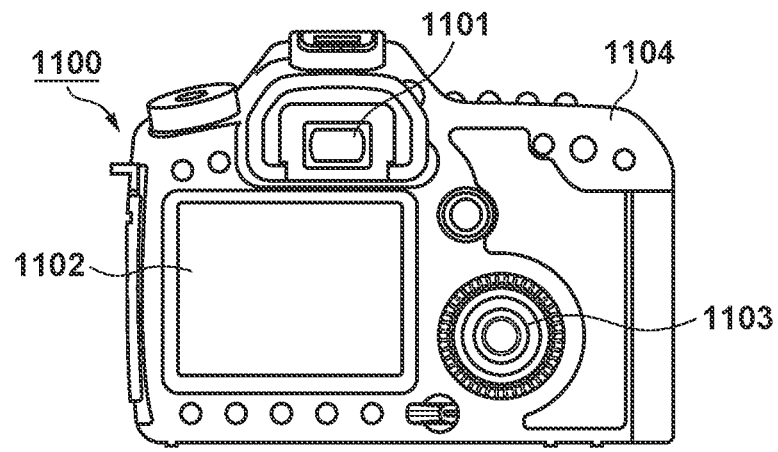
FIG. 11 is a view showing an example of a photoelectric conversion device using the light emitting device according to the embodiment.

FIG. 11 is a schematic view showing an example of the photoelectric conversion device using the light emitting device 100 of this embodiment. A photoelectric conversion device 1100 can include a viewfinder 1101, a rear display 1102, an operation unit 1103, and a housing 1104. The photoelectric conversion device 1100 can also be called an image capturing device. The light emitting device 100 according to this embodiment can be applied to the viewfinder 1101 or the rear display 1102 as a display unit. In this case, the light emitting device 100 can display not only an image to be captured but also environment information, image capturing instructions, and the like. Examples of the environment information are the intensity and direction of external light, the moving velocity of an object, and the possibility that an object is covered with an obstacle.

The timing suitable for image capturing is a very short time in many cases, so the information should be displayed as soon as possible. Therefore, the light emitting device 100 containing the organic light emitting material such as an organic EL element in the light emitting layer may be used for the viewfinder 1101 or the rear display 1102. This is so because the organic light emitting material has a high response speed. The light emitting device 100 using the organic light emitting material can be used for the apparatuses that require a high display speed more suitable than for the liquid crystal display device.

The photoelectric conversion device 1100 includes an optical unit (not shown). This optical unit has a plurality of lenses, and forms an image on a photoelectric conversion element (not shown) that receives light having passed through the optical unit and is accommodated in the housing 1104. The focal points of the plurality of lenses can be adjusted by adjusting the relative positions. This operation can also automatically be performed.

The light emitting device 100 may be applied to a display unit of an electronic apparatus. At this time, the display unit can have both a display function and an operation function. Examples of the portable terminal are a portable phone such as a smartphone, a tablet, and a head mounted display.

Figure 12:
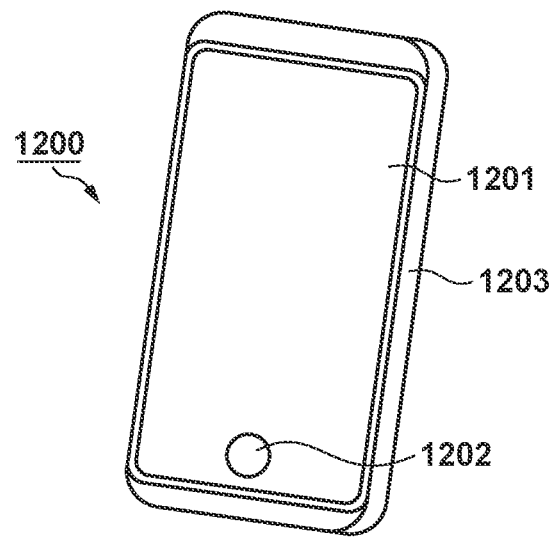
FIG. 12 is a view showing an example of an electronic apparatus using the light emitting device according to the embodiment.

FIG. 12 is a schematic view showing an example of an electronic apparatus using the light emitting device 100 of this embodiment. An electronic apparatus 1200 includes a display unit 1201, an operation unit 1202, and a housing 1203. The housing 1203 can accommodate a circuit, a printed board having this circuit, a battery, and a communication unit. The operation unit 1202 can be a button or a touch-panel-type reaction unit. The operation unit 1202 can also be a biometric authentication unit that performs unlocking or the like by authenticating the fingerprint. The portable apparatus including the communication unit can also be regarded as a communication apparatus. The light emitting device 100 according to this embodiment can be applied to the display unit 1201.

Figure 13A:
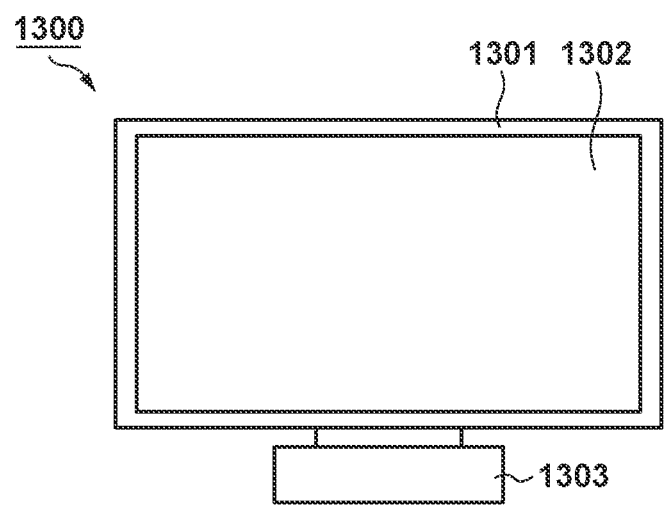
FIGS. 13A and 13B are views each showing an example of a display device using the light emitting device according to the embodiment.
Figure 13B:
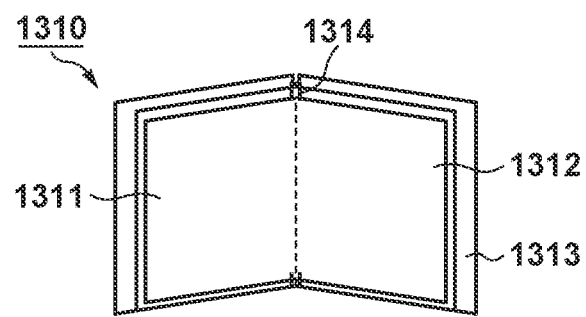

FIGS. 13A and 13B are schematic views showing examples of the display device using the light emitting device 100 of this embodiment. FIG. 13A shows a display device such as a television monitor or a PC monitor. A display device 1300 includes a frame 1301 and a display unit 1302. The light emitting device 100 according to this embodiment can be applied to the display unit 1302. The display device 1300 can include a base 1303 that supports the frame 1301 and the display unit 1302. The base 1303 is not limited to the form shown in FIG. 13A. For example, the lower side of the frame 1301 may also function as the base 1303. In addition, the frame 1301 and the display unit 1302 can be bent. The radius of curvature in this case can be 5,000 mm (inclusive) to 6,000 mm (inclusive).

FIG. 13B is a schematic view showing another example of the display device using the light emitting device 100 of this embodiment. A display device 1310 shown in FIG. 13B can be folded, and is a so-called foldable display device. The display device 1310 includes a first display unit 1311, a second display unit 1312, a housing 1313, and a bending point 1314. The light emitting device 100 according to this embodiment can be applied to each of the first display unit 1311 and the second display unit 1312. The first display unit 1311 and the second display unit 1312 can also be one seamless display device. The first display unit 1311 and the second display unit 1312 can be divided by the bending point. The first display unit 1311 and the second display unit 1312 can display different images, and can also display one image together.

Figure 14:
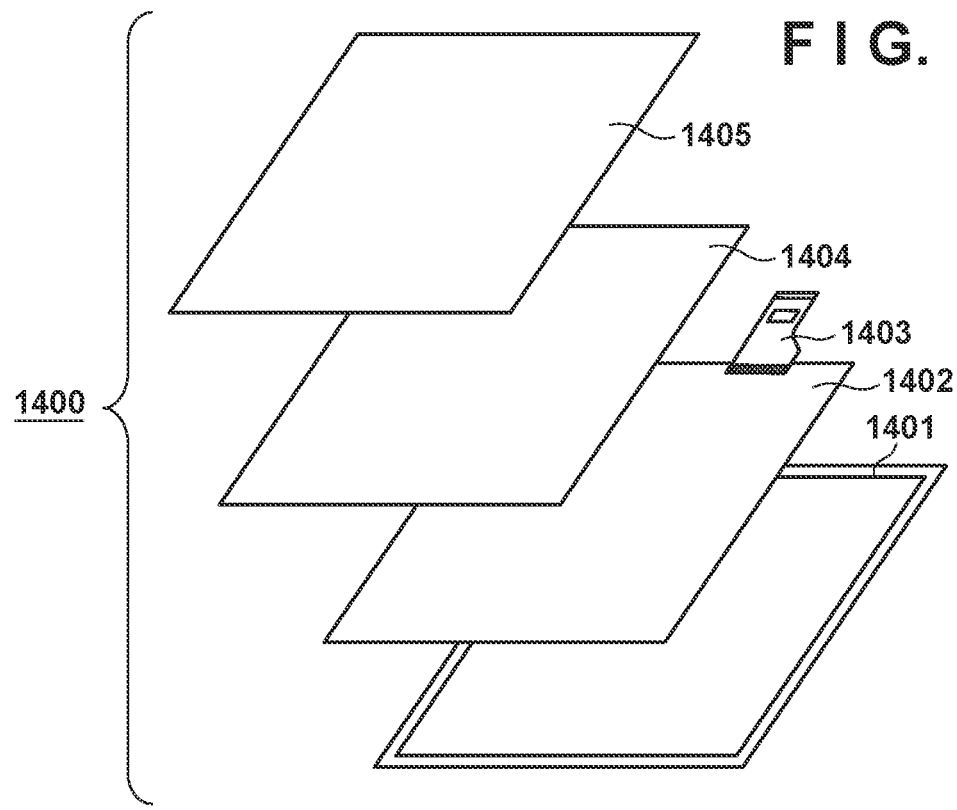
FIG. 14 is a view showing an example of an illumination device using the light emitting device according to the embodiment.

FIG. 14 is a schematic view showing an example of the illumination device using the light emitting device 100 of this embodiment. An illumination device 1400 can include a housing 1401, a light source 1402, a circuit board 1403, an optical film 1404, and a light diffusing unit 1405. The light emitting device 100 according to this embodiment can be applied to the light source 1402. The optical film 1404 can be a filter that improves the color rendering of the light source. When performing lighting-up or the like, the light diffusing unit 1405 can throw the light of the light source over a broad range by effectively diffusing the light. The illumination device can also include a cover on the outermost portion, as needed. The illumination device 1400 can include both or one of the optical film 1404 and the light diffusing unit 1405.

The illumination device 1400 is, for example, a device for illuminating the interior of the room. The illumination device 1400 can emit white light, natural white light, or light of any color from blue to red. The illumination device 1400 can also include a light control circuit for controlling these light components. The illumination device 1400 can also include a power supply circuit connected to the light emitting device 100 functioning as the light source 1402. The power supply circuit is a circuit for converting an AC voltage into a DC voltage. White has a color temperature of 4,200 K, and natural white has a color temperature of 5,000 K. The illumination device 1400 may also include a color filter. In addition, the illumination device 1400 can include a heat radiation unit. The heat radiation unit radiates the internal heat of the device to the outside of the device, and examples are a metal having a high specific heat and liquid silicon.

Figure 15:
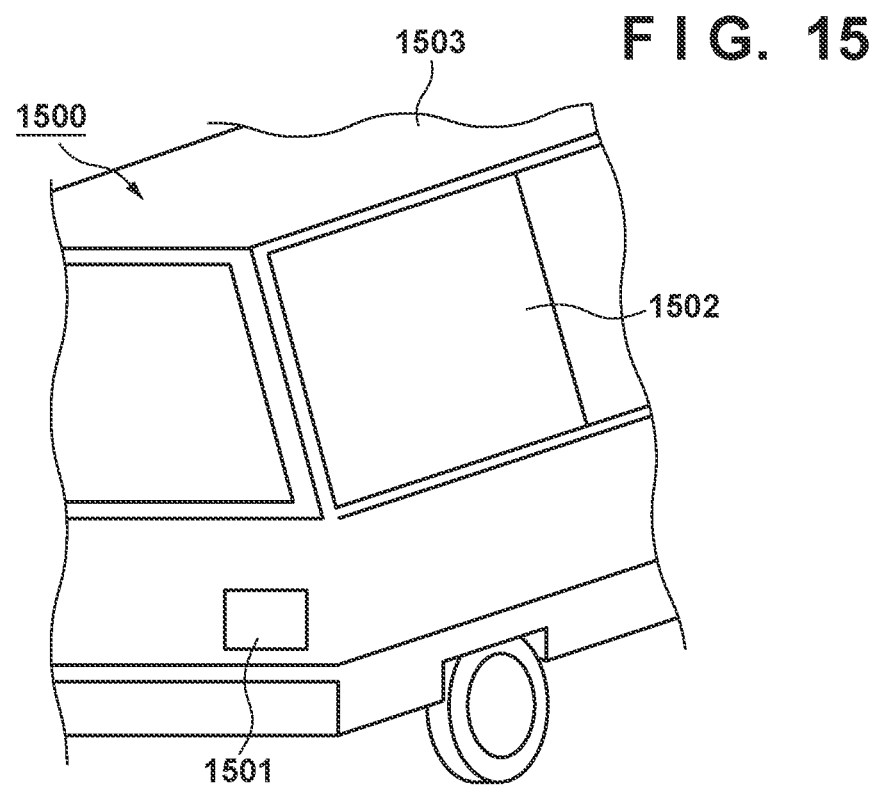
FIG. 15 is a view showing an example of a moving body using the light emitting device according to the embodiment.

FIG. 15 is a schematic view of an automobile having a taillight as an example of a vehicle lighting appliance using the light emitting device 100 of this embodiment. An automobile 1500 has a taillight 1501, and can have a form in which the taillight 1501 is turned on when performing a braking operation or the like. The light emitting device 100 of this embodiment can be used as a headlight serving as a vehicle lighting appliance. The automobile is an example of a moving body, and the moving body may be a ship, a drone, an aircraft, a railroad car, an industrial robot, or the like. The moving body may include a main body and a lighting appliance provided in the main body. The lighting appliance may be used to make a notification of the current position of the main body.

The light emitting device 100 according to this embodiment can be applied to the taillight 1501. The taillight 1501 can include a protection member for protecting the light emitting device 100 functioning as the taillight 1501. The material of the protection member is not limited as long as the material is a transparent material with a strength that is high to some extent, and an example is polycarbonate. The protection member may be made of a material obtained by mixing a furandicarboxylic acid derivative, an acrylonitrile derivative, or the like in polycarbonate.

The automobile 1500 can include a vehicle body 1503, and a window 1502 attached to the vehicle body 1503. This window can be a window for checking the front and back of the automobile, and can also be a transparent display. For this transparent display, the light emitting device 100 according to this embodiment may be used. In this case, the constituent materials of the electrodes and the like of the light emitting device 100 are formed by transparent members.

Figure 16A:
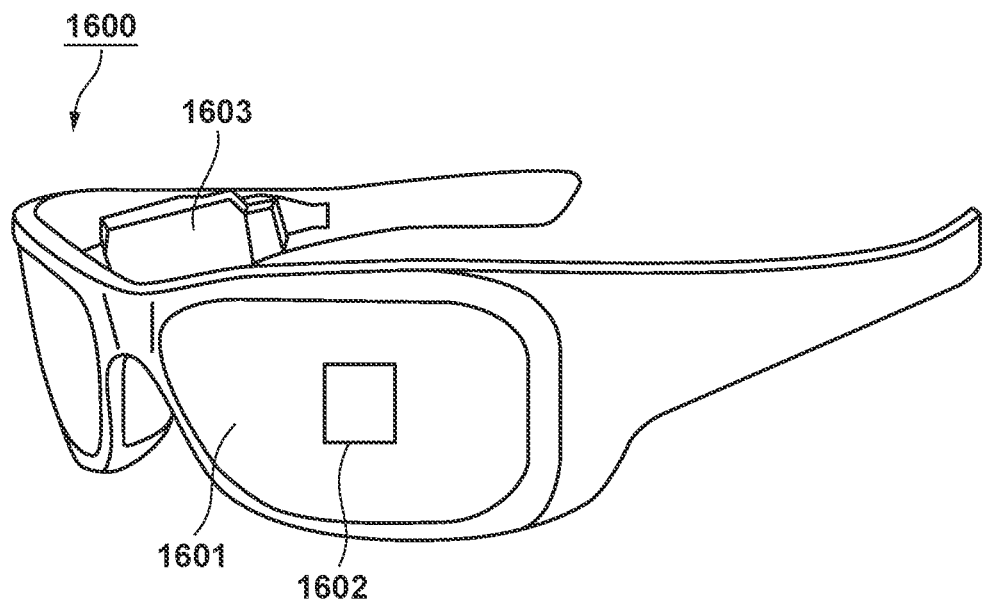
FIGS. 16A and 16B are views each showing an example of a wearable device using the light emitting device according to the embodiment.
Figure 16B:
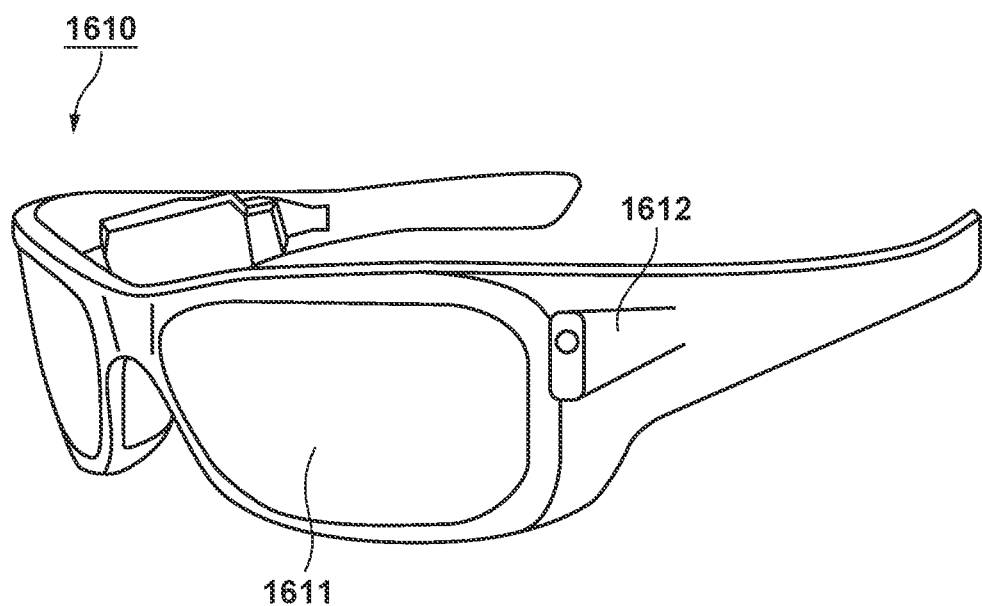

Further application examples of the light emitting device 100 according to this embodiment will be described with reference to FIGS. 16A and 16B. The light emitting device 100 can be applied to a system that can be worn as a wearable device such as smartglasses, a Head Mounted Display (HMD), or a smart contact lens. An image capturing display device used for such application examples includes an image capturing device capable of photoelectrically converting visible light and a light emitting device capable of emitting visible light.

Glasses 1600 (smartglasses) according to one application example will be described with reference to FIG. 16A. An image capturing device 1602 such as a CMOS sensor or an SPAD is provided on the surface side of a lens 1601 of the glasses 1600. In addition, the light emitting device 100 according to this embodiment is provided on the back surface side of the lens 1601.

The glasses 1600 further include a control device 1603. The control device 1603 functions as a power supply that supplies electric power to the image capturing device 1602 and the light emitting device 100 according to each embodiment. In addition, the control device 1603 controls the operations of the image capturing device 1602 and the light emitting device 100. An optical system configured to condense light to the image capturing device 1602 is formed on the lens 1601.

Glasses 1610 (smartglasses) according to one application example will be described with reference to FIG. 16B. The glasses 1610 include a control device 1612, and an image capturing device corresponding to the image capturing device 1602 and the light emitting device 100 are mounted on the control device 1612. The image capturing device in the control device 1612 and an optical system configured to project light emitted from the light emitting device 100 are formed in a lens 1611, and an image is projected to the lens 1611. The control device 1612 functions as a power supply that supplies electric power to the image capturing device and the light emitting device 100, and controls the operations of the image capturing device and the light emitting device 100. The control device 1612 may include a line-of-sight detection unit that detects the line of sight of a wearer. The detection of a line of sight may be done using infrared rays. An infrared ray emitting unit emits infrared rays to an eyeball of the user who is gazing at a displayed image. An image capturing unit including a light receiving element detects reflected light of the emitted infrared rays from the eyeball, thereby obtaining a captured image of the eyeball. A reduction unit for reducing light from the infrared ray emitting unit to the display unit in a planar view is provided, thereby reducing deterioration of image quality.

The line of sight of the user to the displayed image is detected from the captured image of the eyeball obtained by capturing the infrared rays. An arbitrary known method can be applied to the line-of-sight detection using the captured image of the eyeball. As an example, a line-of-sight detection method based on a Purkinje image obtained by reflection of irradiation light by a cornea can be used.

More specifically, line-of-sight detection processing based on pupil center corneal reflection is performed. Using pupil center corneal reflection, a line-of-sight vector representing the direction (rotation angle) of the eyeball is calculated based on the image of the pupil and the Purkinje image included in the captured image of the eyeball, thereby detecting the line-of-sight of the user.

The light emitting device 100 according to the embodiment of the present invention can include an image capturing device including a light receiving element, and control a displayed image based on the line-of-sight information of the user from the image capturing device.

More specifically, the light emitting device 100 decides a first visual field region at which the user is gazing and a second visual field region other than the first visual field region based on the line-of-sight information. The first visual field region and the second visual field region may be decided by the control device of the light emitting device 100, or those decided by an external control device may be received. In the display region of the light emitting device 100, the display resolution of the first visual field region may be controlled to be higher than the display resolution of the second visual field region. That is, the resolution of the second visual field region may be lower than that of the first visual field region.

In addition, the display region includes a first display region and a second display region different from the first display region, and a region of higher priority is decided from the first display region and the second display region based on line-of-sight information. The first display region and the second display region may be decided by the control device of the light emitting device 100, or those decided by an external control device may be received. The resolution of the region of higher priority may be controlled to be higher than the resolution of the region other than the region of higher priority. That is, the resolution of the region of relatively low priority may be low.

Note that AI may be used to decide the first visual field region or the region of higher priority. The AI may be a model configured to estimate the angle of the line of sight and the distance to a target ahead the line of sight from the image of the eyeball using the image of the eyeball and the direction of actual viewing of the eyeball in the image as supervised data. The AI program may be held by the light emitting device 100, the image capturing device, or an external device. If the external device holds the AI program, it is transmitted to the light emitting device 100 via communication.

When performing display control based on line-of-sight detection, smartglasses further including an image capturing device configured to capture the outside can be applied. The smartglasses can display captured outside information in real time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-048419, filed Mar. 24, 2022, which is hereby incorporated by reference herein in its entirety.

What is claimed is:

1. A light emitting device in which comprising:
a pixel including a light emitting element;
a driving transistor having a first main terminal connected to the light emitting element and a back gate terminal;
a light emission control transistor arranged between a second main terminal of the driving transistor and a supply line that supplies a first potential;
a write transistor configured to supply a luminance signal to a control terminal of the driving transistor; and
a capacitive element arranged between the second main terminal and the control terminal of the driving transistor,
wherein:
the back gate terminal of the driving transistor is supplied with a second potential,
one frame period includes a write period during which the luminance signal is written in the control terminal of the driving transistor, and a light emission period during which the light emitting element emits light corresponding to the luminance signal, and
after a start of the write period and before an end of the write period, the light emission control transistor is rendered conductive.

2. The light emitting device according to claim 1, wherein a length of a period from when the light emission control transistor changes from a conductive state to a non-conductive state in the write period until the write period ends is longer than a length of a period during which the light emission control transistor is rendered conductive in the write period.

3. The light emitting device according to claim 1, wherein the first potential is the same as the second potential.

4. The light emitting device according to claim 1, wherein after the end of the write period and before a start of the light emission period, the write transistor is rendered conductive again and the luminance signal is written in the control terminal.

5. The light emitting device according to claim 4, wherein a length of a period during which the write transistor is rendered conductive again after the end of the write period and before the start of the light emission period is shorter than a length of the write period.

6. The light emitting device according to claim 4, wherein a length of a period during which the write transistor is rendered conductive again after the end of the write period and before the start of the light emission period is shorter than a length of a period from when the light emission control transistor changes from a conductive state to a non-conductive state in the write period until the write period ends.

7. The light emitting device apparatus to claim 1, wherein the pixel further includes a reset transistor configured to reset, to a third potential, a terminal connected to the first main terminal out of two terminals of the light emitting element.

8. The light emitting device according to claim 7, wherein during the write period, the reset transistor is in a conductive state.

9. The light emitting device according to claim 7, wherein a potential supplied to a terminal not connected to the first main terminal out of the two terminals of the light emitting element is the same as the third potential.

10. The light emitting device according to claim 1, wherein the pixel further includes an additional capacitive element arranged between the capacitive element and a supply line that supplies a fourth potential.

11. The light emitting device according to claim 10, wherein the first potential is the same as the fourth potential.

12. The light emitting device apparatus according to claim 1, wherein the driving transistor is a p-channel transistor.

13. The light emitting device according to claim 1, wherein a length of a period from the end of the write period to a start of the light emission period is longer than a length of the write period.

14. A display device comprising:
the light emitting device according to claim 1; and
an active element connected to the light emitting device.

15. A photoelectric conversion device comprising:
an optical unit including a plurality of lenses;
an image sensor configured to receive light having passed through the optical unit; and
a display unit configured to display an image,
wherein the display unit displays an image captured by the image sensor, and includes the light emitting device according to claim 1.

16. An electronic apparatus comprising:

a housing provided with a display unit; and a communication unit provided in the housing and configured to perform external communication, wherein the display unit includes the light emitting device according to claim 1.

17. An illumination device comprising:

a light source; and at least one of a light diffusing unit and an optical film, wherein the light source includes the light emitting device according to claim 1.

18. A moving body comprising:

a main body; and a lighting appliance provided in the main body, wherein the lighting appliance includes the light emitting device according to claim 1.

19. A wearable device comprising:

a display device configured to display an image, wherein the display device includes the light emitting device according to claim 1.

* * * * *